United States Patent
Jau et al.

(10) Patent No.: US 9,454,202 B2
(45) Date of Patent: Sep. 27, 2016

(54) POWER MANAGEMENT METHOD FOR SERVER SYSTEM

(71) Applicant: Quanta Computer Inc., Tao Yuan Shien (TW)

(72) Inventors: Maw-Zan Jau, Taipei (TW); Tzu-Hung Wang, Keelung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 335 days.

(21) Appl. No.: 13/920,378

(22) Filed: Jun. 18, 2013

(65) Prior Publication Data

US 2014/0281646 A1    Sep. 18, 2014

(30) Foreign Application Priority Data

Mar. 15, 2013 (TW) .............................. 102109323 A

(51) Int. Cl.
| | | |
|---|---|---|
| *G06F 1/30* | (2006.01) | |
| *G06F 1/32* | (2006.01) | |
| *G06F 1/26* | (2006.01) | |
| *G06F 1/28* | (2006.01) | |

(52) U.S. Cl.
CPC ................. *G06F 1/30* (2013.01); *G06F 1/263* (2013.01); *G06F 1/28* (2013.01); *G06F 1/3206* (2013.01); *G06F 1/3234* (2013.01)

(58) Field of Classification Search
CPC ....... G06F 1/30; G06F 1/3206; G06F 1/3234
See application file for complete search history.

(56) References Cited

U.S. PATENT DOCUMENTS

| | | | | |
|---|---|---|---|---|
| 5,838,929 A | * | 11/1998 | Tanikawa | 710/302 |
| 6,274,949 B1 | * | 8/2001 | Lioux et al. | 307/64 |
| 6,509,657 B1 | * | 1/2003 | Wong et al. | 307/66 |
| 8,108,700 B2 | * | 1/2012 | Wilson et al. | 713/300 |
| 2011/0018342 A1 | | 1/2011 | Park et al. | |
| 2012/0151228 A1 | | 6/2012 | Chao | |

FOREIGN PATENT DOCUMENTS

| | | |
|---|---|---|
| CN | 102474129 A | 5/2012 |
| TW | 201224727 A | 6/2012 |
| TW | 201224727 A1 | 6/2012 |
| TW | M439202 U1 | 10/2012 |

OTHER PUBLICATIONS

Office Action mailed on Apr. 27, 2015 in Taiwan Application No. 102109323.
English Summary of Office Action mailed on Apr. 27, 2015 in Taiwan Application No. 102109323.
English Translation Abstracts of Foreign Patent Documents: TW201224727 and TWM439202.
Chinese Office Action mailed Feb. 29, 2016 for counterpart Chinese Application No. 201310113595.7.

* cited by examiner

*Primary Examiner* — Stefan Stoynov
(74) *Attorney, Agent, or Firm* — Polsinelli PC

(57) ABSTRACT

A power management method for a server system is provided. At least any one of a power status indication signal and an alert signal from a power supply is detected to judge whether an input voltage is normal. If it is judged that the input voltage is abnormal, a motherboard sends the power status indication signal to a battery backup unit (BBU) to inform the BBU to supply power to the motherboard. If it is judged that the input voltage is abnormal, the motherboard lowers its loading.

7 Claims, 3 Drawing Sheets

POWER MANAGEMENT METHOD FOR SERVER SYSTEM

This application claims the benefit of Taiwan application Serial No. 102109323, filed Mar. 15, 2013, the subject matter of which is incorporated herein by reference.

TECHNICAL FIELD

The application relates in general to a power management method for a server system, and more particularly to a power management method for a server system having a battery backup unit.

BACKGROUND

A server system can manage resource, provide high quality services to users and have high computational ability. Thus, the server system is highly valued in the business industry. With develop of communication network, the server system may provide services to clients via communication network.

The server system at least comprises a motherboard and a server power system. The server power system comprises multiple power supplies. The power supply converts an AC voltage into a DC voltage and further outputs the DC voltage to the motherboard.

The reason for using multiple power supplies in the server system is that in case one or even more than one power supply breaks down, remaining power supplies still provide power to maintain normal operation of the server system.

Besides, a battery backup unit (BBU) is added to the server power system to avoid normal operation of the motherboard being affected by unexpected interruption of AC voltage.

When the AC input voltage (i.e. the grid power) is normal, the power supply provides power to the server cabinet system and charges the BBU at the same time. When the grid power is interrupted or unstable, the power supply stops supplying power and informs the BBU about power interruption.

The BBU must provide power to the motherboard before the power supply fails to normally supply power to the motherboard.

Since design of the old-type power supply may not support direct communication with the BBU, the old-type power supply cannot be used in the server system having a BBU.

When it is detected that the AC voltage is abnormal, the power supply had better have informed the BBU to supply power to the motherboard timely to avoid the operation of the server system being affected.

SUMMARY

The application is directed to a power management method for a server system having a battery backup unit (BBU). The basis on which the motherboard controls the BBU is changed, such that the server system still can use the power supply which does not have a function of providing an AC power good signal.

According to an embodiment of the present application, a power management method for a server system is provided. At least any one of a power status indication signal and an alert signal sent from a power supply is detected to judge whether an input voltage is normal. If it is judged that the input voltage is abnormal, a motherboard sends the power status indication signal to a battery backup unit (BBU) to inform the BBU to supply power to the motherboard. If it is judged that the input voltage is abnormal, the motherboard lowers its loading.

The above and other contents of the application will become better understood with regard to the following detailed description of the non-limiting embodiment(s). The following description is made with reference to the accompanying drawings.

DETAILED DESCRIPTION OF EMBODIMENT OF THE APPLICATION

Figure 1:
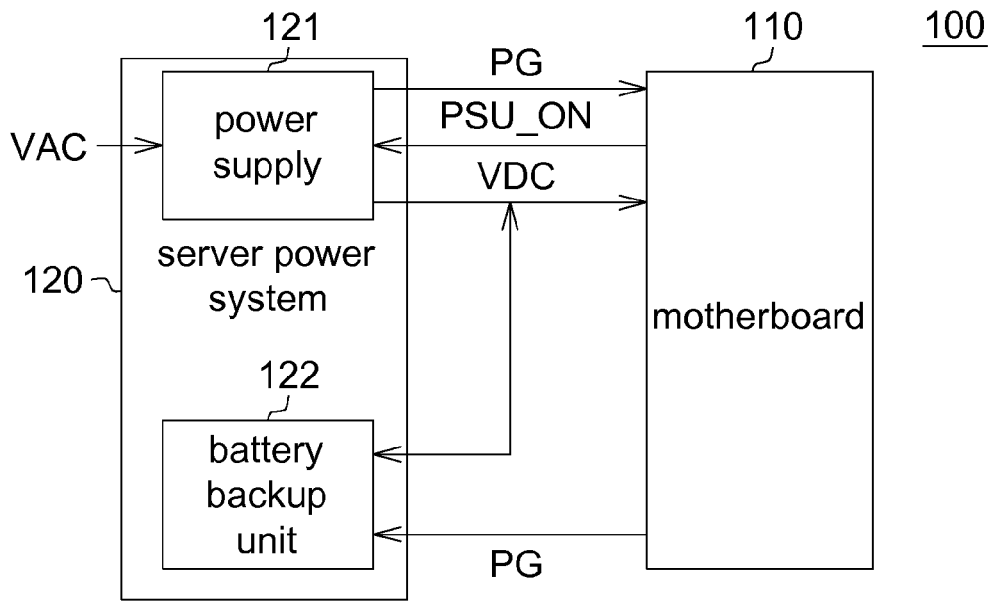
FIG. 1 shows a function block diagram of a server system according to an embodiment of the disclosure.

FIG. 1 shows a function block diagram of a server system according to an embodiment of the disclosure. As indicated in FIG. 1, the server system 100 at least comprises a motherboard 110 and a server power system 120. The server power system 120 at least comprises a power supply 121 and a battery backup unit (BBU) 122. FIG. 1 shows that the server power system 120 comprises a power supply 121 and a BBU 122. However, such exemplification is for exemplary and explanatory purpose only, not for limiting the scope of protection of the disclosure. In other possible embodiments of the disclosure, the server power system 120 may comprise multiple power supplies 121 and/or multiple BBUs 122, which is within the spirit of the disclosure.

The power supply 121 converts an AC voltage VAC into a DC voltage VDC, and outputs the DC voltage VDC to the circuit board 11. The reason for using multiple power supplies 121 is that in case one or more than one power supply 121 breaks down, remaining power supplies 121 still can provide power to maintain normal operation of the server system 100.

The power supply 121 detects an AC voltage VAC and outputs a power good signal PG to the motherboard 110. The motherboard 110 may obtain the status of the power supply 121 based on the power good signal PG. Furthermore, the motherboard 110 may execute related operations according to the power good signal PG (exemplarily but not restrictively, resetting of internal circuits of the motherboard). In addition, the motherboard 110 provides the power good signal PG to the BBU 122, which accordingly judges whether to supply power to the motherboard 110. Details of the present embodiment are disclosed below.

Figure 2:
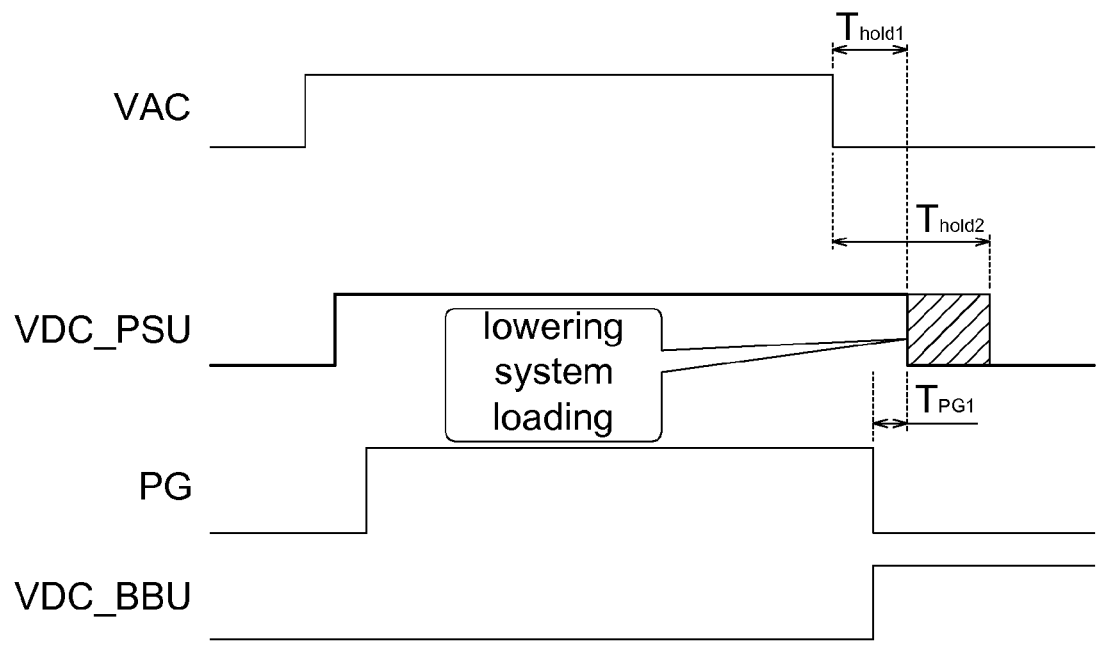
FIG. 2 shows a signal timing diagram according to an embodiment of the disclosure.

Referring to FIG. 2, a signal timing diagram according to an embodiment of the disclosure is shown. In FIG. 2, the power supply DC output voltage VDC_PSU is a DC voltage outputted to the motherboard 110 from the power supply 121, and the BBU DC output voltage VDC_BBU is a DC voltage outputted to the motherboard 110 from the BBU 122. As indicated in FIG. 1, the power supply DC output voltage VDC_PSU and the BBU DC output voltage VDC_BBU are in parallel.

After the AC voltage VAC is interrupted, the power supply 121 continues outputting the DC voltage VDC (that is, VDC_PSU) to the motherboard 110 within the holding period $T_{hold1}$. However, the DC voltage VDC_PSU outputted from the power supply 121 within the holding period $T_{hold1}$ may not be the same as the DC voltage originally outputted from the power supply 121.

A starting point of the holding period $T_{hold2}$ is set at when the AC voltage VAC is interrupted. In an embodiment of the disclosure, within the holding period $T_{hold2}$, the motherboard 110 needs to lower loading, such that the DC voltage VDC_PSU outputted from the power supply 121 supports the operation of the motherboard 110 until the BBU 122 is activated timely to provide the DC voltage VDC_BBU to the motherboard 110. Exemplarily but not restrictively, the motherboard 110 can quickly lower its loading by hardware interrupt. The loading of the motherboard 110 may be lowered by such as lowering operating frequencies of electronic elements (such as CPU and memory) on the motherboard 110.

When the AC voltage VAC is interrupted, the power good signal PG outputted from the power supply 121 must reflect to the motherboard 110 timely before the DC voltage VDC_PSU outputted from the power supply 121 disappears. For example, the power good signal PG reflects to the motherboard 110 within the power good delay period $T_{PG1}$ as indicated in FIG. 2.

Figure 3:
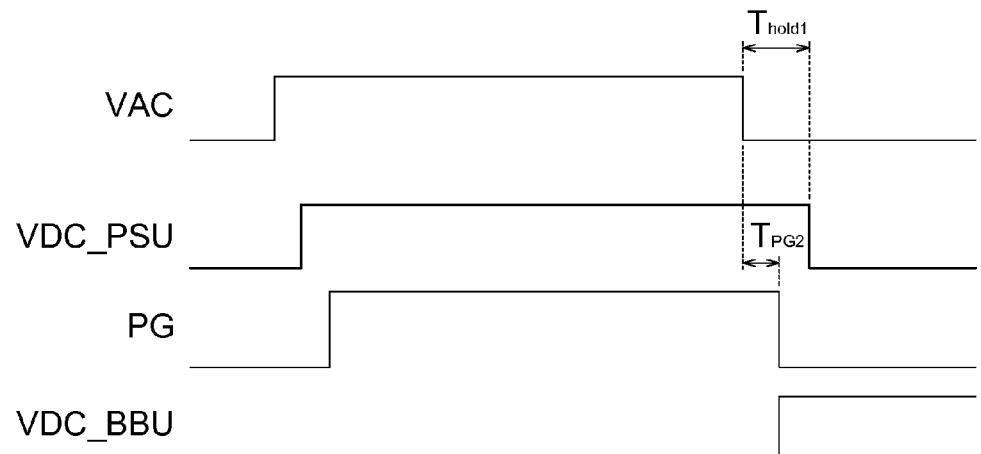
FIG. 3 shows another signal timing diagram according to an embodiment of the disclosure.

In an embodiment of the disclosure, the timing design of the power good signal PG has another implementation. FIG. 3 shows another signal timing diagram according to an embodiment of the disclosure. The signal transitional timing of the power good signal PG is earlier in FIG. 3 than in FIG. 2. Early transition of the power good signal PG of FIG. 3 may reflect the interruption of the AC voltage VAC to the motherboard 110 earlier than FIG. 2. Thus, the motherboard 110 may detect transition of the power good signal PG early and then inform the BBU 122 early, such that the BBU 122 may be activated timely to provide the DC voltage VDC_BBU to the motherboard 110.

The power supply 121 may output an alert signal SMB_ALERT or the power good signal PG or other similar alert signal to the motherboard 110 to reflect the emergent event of the power supply 121. In an embodiment of the disclosure, the power good signal PG or the alert signal SMB_ALERT or other similar alert signal may be used to timely inform the BBU 122.

Figure 4:
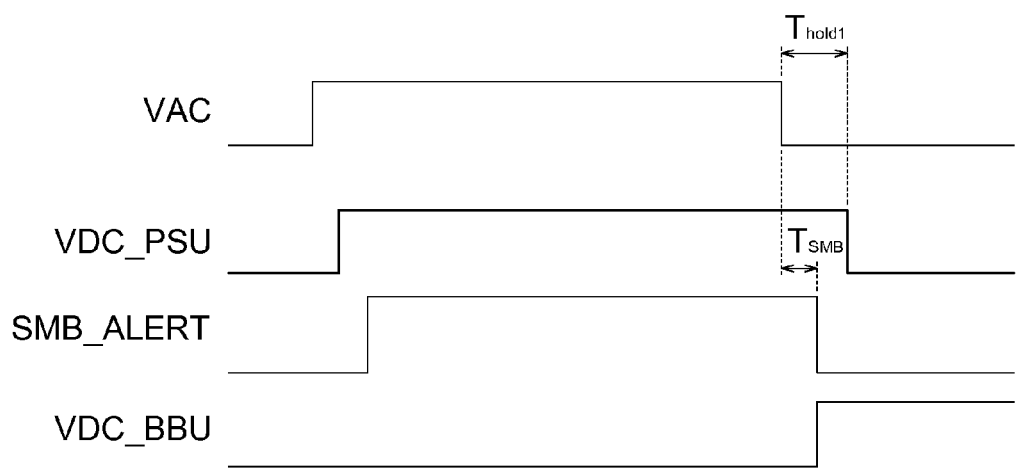
FIG. 4 shows an alternate signal timing diagram according to an embodiment of the disclosure.

FIG. 4 shows an alternate signal timing diagram according to an embodiment of the disclosure. In FIG. 4, if the AC voltage VAC is interrupted, the alert signal SMB_ALERT is transitioned within the period $T_{SMB}$. Thus, the motherboard 110 may detect early transition of the power good signal PG, the alert signal SMB_ALERT, or other similar alert signal earlier (in comparison to FIG. 2) and thus may early inform the BBU 122, such that the BBU 122 may be activated timely to provide the DC voltage VDC_BBU to the motherboard 110.

Figure 5:
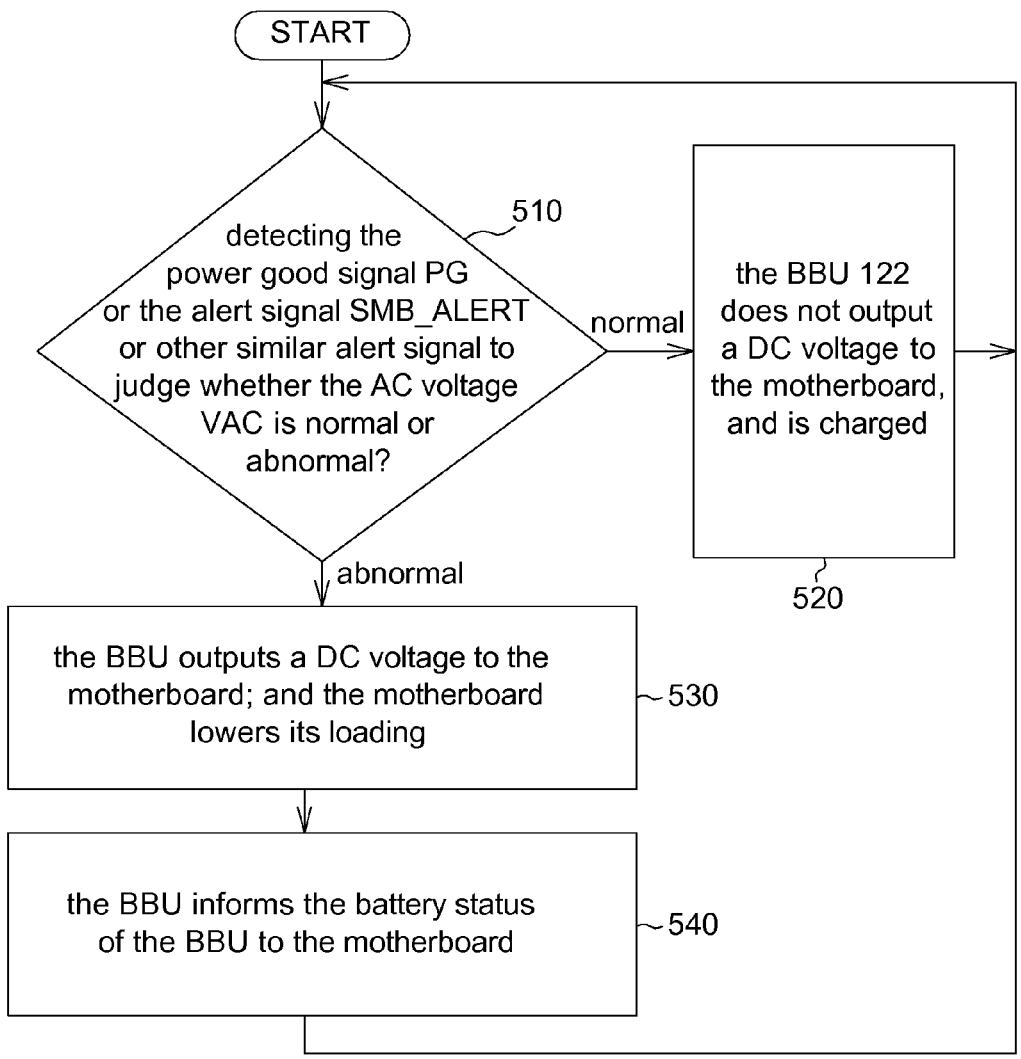
FIG. 5 shows a flowchart of a power management method for a server system according to an embodiment of the disclosure.

Referring to FIG. 5, a flowchart of a power management method for a server system according to an embodiment of the disclosure is shown. As indicated in FIG. 5, in step 510, the power good signal PG or the alert signal SMB_ALERT or other similar alert signal is detected to judge whether the AC voltage VAC is normal or abnormal.

As disclosed above, in a possible implementation, the motherboard 110 may detect the power good signal PG or the alert signal SMB_ALERT or other similar alert signal to judge whether the AC voltage VAC is normal or abnormal. In another possible implementation, the BBU 122 may detect the power good signal PG to judge whether the AC voltage VAC is normal or abnormal.

The process proceeds to step 520 if it is detected that the AC voltage VAC is normal, and proceeds to step 530 if it is detected that the AC voltage VAC is abnormal.

In step 520, the AC voltage VAC is normal, so the BBU 122 does not output the DC voltage to the motherboard, and is charged.

In step 530, the AC voltage VAC is abnormal, so the BBU 122 outputs the DC voltage to the motherboard 110. As disclosed above, the motherboard 110 may lower its loading to further assure that the operation of the motherboard 110 is well before the BBU 122 outputs the DC voltage to the motherboard 110.

In step 540, the BBU 122 informs the battery status of the BBU 122 to the motherboard 110, such that the motherboard 110 may adjust its loading accordingly. Exemplarily but not restrictively, if the battery status indicates that the battery has sufficient electricity, then the motherboard 110 may adjust its loading from a low loading state to a high loading state.

In an embodiment of the disclosure, since the power supply 121 does not need to provide the power good signal PG to the BBU 122, even an old-type power supply is suitable to the server system of an embodiment of the disclosure.

Besides, the transition timing of the power good signal PG and/or the alert signal SMB_ALERT and/or other similar alert signal may be adjusted to further assure that the BBU 122 may timely supply power to the motherboard 110 when the AC voltage VAC is interrupted.

In an embodiment of the disclosure, any combination of the above implementations would do. For example, the timing design can be any combination of the timing design of FIGS. 2~4; and the power supply may send any combination of the power good signal PG and the alert signal SMB_ALERT and other similar alert signal to the motherboard. The above combinations of implementations are still within the spirit of the disclosure.

While the application has been described by way of example and in terms of the embodiment(s), it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power management method for a server system, the server system at least comprising a battery backup unit (BBU), a motherboard and at least a power supply, the power management method comprising:

detecting, by the motherboard, at least anyone of a power status indication signal and an alert signal sent from the power supply to judge whether an input voltage is normal;

sending the power status indication signal by the motherboard to the BBU to inform the BBU to supply power to the motherboard if it is judged that the input voltage is abnormal;

lowering loading of the motherboard to a low loading state by hardware interrupt if it is judged that the input voltage is abnormal, wherein the low loading state allows the motherboard to stay powered on with lower performance than a high loading state;

detecting a battery level of the BBU; and increasing loading of the motherboard from the low loading state to the high loading state, in response to the battery level detected as high.

2. The power management method for a server system according to claim 1, wherein the motherboard judges whether the input voltage is normal according to at least anyone of the power status indication signal sent from the power supply and the alert signal.

3. The power management method for a server system according to claim 1, wherein the BBU judges whether the input voltage is normal according to the power status indication signal sent from the motherboard.

4. The power management method for a server system according to claim 1, wherein:
 if it is judged that the input voltage is normal, the BBU does not supply power to the motherboard and the BBU is charged.

5. The power management method for a server system according to claim 1, further comprising:
 sending an internal battery status by the BBU to inform the motherboard to adjust its loading accordingly.

6. The power management method for a server system according to claim 1, wherein before an output DC voltage provided to the motherboard from the power supply disappears, the power status indication signal sent from the power supply transitions, such that the motherboard accordingly informs the BBU to supply power to the motherboard.

7. The power management method for a server system according to claim 1, wherein before an output DC voltage provided to the motherboard from the power supply disappears, the alert signal sent from the power supply transitions, such that the motherboard accordingly informs the BBU to supply power to the motherboard.

* * * * *